(12) United States Patent
Miyazaki (10) Patent No.: US 6,190,262 B1
(45) Date of Patent: Feb. 20, 2001

(54) ROLLING BEARING UNIT FOR VEHICLE WHEEL

(75) Inventor: Hiroya Miyazaki, Fujisawa (JP)

(73) Assignee: NSK Ltd., Tokyo (JP)

( * ) Notice: Under 35 U.S.C. 154(b), the term of this patent shall be extended for 0 days.

(21) Appl. No.: 09/210,756

(22) Filed: Dec. 15, 1998

(30) Foreign Application Priority Data

Dec. 17, 1997 (JP) .................................................. 9-347598

(51) Int. Cl.[7] .............................. F16D 3/16; F16C 35/68
(52) U.S. Cl. ......................... 464/178; 464/145; 464/906
(58) Field of Search ................................... 464/139, 141, 464/142, 143, 195, 178, 906; 384/516

(56) References Cited

U.S. PATENT DOCUMENTS

| | | | |
|---|---|---|---|
| 1,587,184 | * 6/1926 | Riebe | ..................................... 384/516 |
| 4,611,373 | 9/1986 | Hazebrook . | |
| 5,051,004 | 9/1991 | Takeuchi et al. . | |
| 5,549,514 | * 8/1996 | Welschof | .............................. 464/145 |
| 5,975,767 | * 11/1999 | Mizukoshi et al. | ................... 464/145 |

* cited by examiner

Primary Examiner—Lynne H. Browne
Assistant Examiner—Kenneth Thompson
(74) Attorney, Agent, or Firm—Evenson, McKeown, Edwards & Lenahan, P.L.L.C.

(57) ABSTRACT

A rolling bearing unit for a vehicle wheel comprising a stationary member fixed to a suspension and having an outer ring raceway, a rotatable member provided to support the vehicle wheel and having an inner ring raceway and a housing which is to be an outer ring of a constant velocity joint, a plurality of rolling members between the outer ring raceway and the inner ring raceway, balls being in contact with the housing having a plurality of outer engagement grooves extending at right angles with respect to the circumferential direction, the opening on both of the circumferential sides of the outer engagement grooves provided with a chamfered portion having a radial size which is larger than the elastic displacement of the area of contact between the balls and the housing adjacent to each other when the surface pressure at the center of the contact portion of the housing with the balls reaches 4200 MPa.

3 Claims, 8 Drawing Sheets

ROLLING BEARING UNIT FOR VEHICLE WHEEL

THE BACKGROUND OF THE INVENTION

The present invention relates to a rolling-bearing unit for a wheel which is called a fourth-generation hub unit and is used for supporting the driven wheels {front wheels for a FF vehicle (front-engine front-wheel drive vehicle), rear wheels for a FR vehicle (front-engine rear-wheel drive vehicle) and RR vehicle (rear-engine rear-wheel drive vehicle) and all wheels for a 4WD vehicle (four-wheel drive vehicle)} that are supported by an independent-type suspension such that they rotate rotate freely with respect to the suspension device.

In order to support the wheels such that they are able to freely with respect to the suspension device, various kinds of rolling-bearing units for wheels have been used which comprises an outer race and inner race that rotate freely by way of rolling members. Moreover, a rolling-bearing unit for wheels that is used in an independent-type suspension device for supporting the driven wheels, must be combined with a constant velocity joint and smoothly (maintaining constant velocity) transmit the rotation of the drive shaft to the wheels regardless of the relative displacement of the differential gear and drive shaft or of the steering angle applied to the wheels. This kind of rolling-bearing unit for wheels, which is combined with a constant velocity joint, and can be configured such that it is relatively compact and light weight, is called a fourth-generation hub unit, and has previously been known as disclosed in Patent Publication No. Toku Kai Hei 7-317754.

Figure 1:
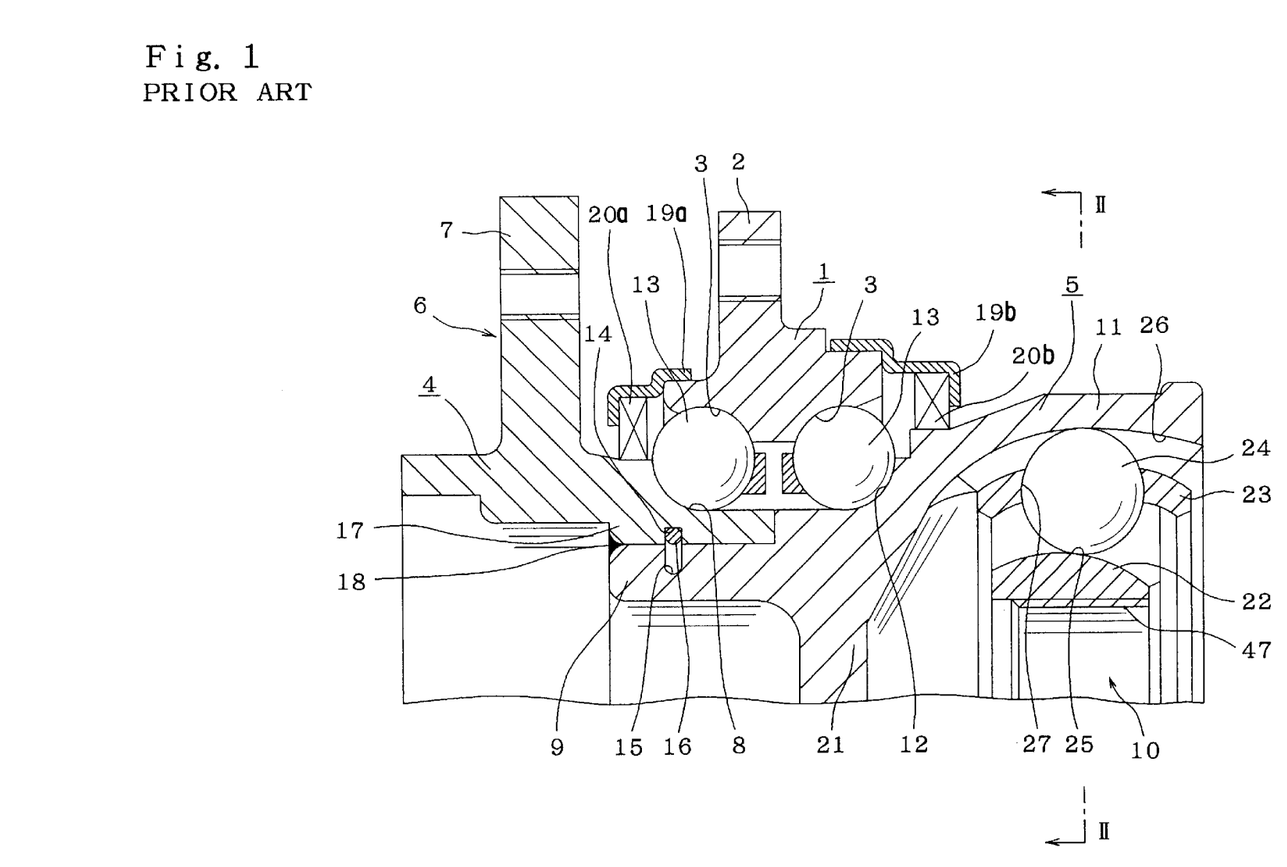
FIG. 1 is a partial cross sectional view of a conventional structure of the rolling bearing unit for vehicle wheel.

FIG. 1 shows the construction as disclosed in the aforementioned patent publication. With rolling-bearing unit installed in the vehicle, an outer race 1 (outer ring like member) is supported by the suspension device such that it does not rotate, and it has a first installation flange 2 formed around its outer peripheral surface for attaching it to the suspension device, and multiple rows of outer-ring raceways 3 formed around its inner peripheral surface. On the inside of this outer race 1, there is a hub 6 which comprises a first inner-race member 4 and a second inner-race member 5. Of these, the first inner-race member 4 is of a cylindrical shape and has a second installation flange 7 for supporting the wheel formed on one end side (left end side in FIG. 1), and a first inner-ring raceway 8 formed around its other end side (right end side in FIG. 1) around its outer peripheral surface, respectively. With respect to this, the second inner-race member 5 has a cylindrical section 9 on one end (left end in FIG. 1) for fitting around and attaching to the first inner-race member 4, and a housing portion 11, on its other end (right end in FIG. 1), which acts as the outer ring of a constant velocity joint 10 of the Rzeppa-type and a second inner-ring raceway 12 formed around its outer surface in the center section. Moreover, by placing multiple rolling member 13 between the outer-ring raceways 3 and the first and second inner-race raceways 8, 12, it is possible to support the hub 6 on the inside of the outer race 1 such that it can rotate freely.

Also, attachment grooves 14, 15 are formed around the inner peripheral surface of the first inner-race member 4 and the outer peripheral surface of the second inner-race member 5 in the location where they come together, and a stopping ring 16 is placed in both of these attachment grooves 14, 15 to prevent the first inner-race member 4 from coming out of the second inner-race member 5. Furthermore, welding 18 is performed between the outer peripheral edge of one end face (left end face in FIG. 1) of the second inner-race member 5 and the inner peripheral edge of a step section 17 that is formed around the inner peripheral surface of the first inner-race member 4, and it joins and fastens the first and second inner-race member 4, 5 together.

Also, between the opening on both ends of the outer race 1 and the outer surface in the center of the hub 6, there are cylindrical shaped covers 19a, 19b that are made of metal such as stainless steel, and ring shaped seal rings 20a, 20b that are made of an elastic material such as rubber or elastomer. These covers 19a, 19b and seal rings 20a, 20b isolate the area where the multiple rolling members 13 are located from the outside, and they present the grease in that section from leaking out, as well as foreign matter such as rain water or dirt from getting inside this section. Moreover, on the inside of the center section of the second inner-race member 5, there is a partition plate 21 that closes off the inside of this second inner-race member 5, and it helps maintain the rigidity of the second inner-race member 5, as well as prevents foreign matter that gets inside this second inner-race 5 through the opening on the tip end (left end in FIG. 1) of this second inner-race member 5 from reaching the section of the constant velocity joint 10 that is located inside the housing 11.

Moreover, the constant velocity joint 10 comprises the housing 11, inner ring 22, retainer 23 and multiple ball 24. Of these, the inner ring 22 is driven and rotated by the engine by way of the transmission, and is attached to the tip end of the drive shaft (not shown in the drawings). Around the outer peripheral surface of this inner ring 22 there are six inside engagement grooves 25 which have a circular arc shaped cross section when cut along an imaginary plane that crosses the center axis of this inner ring 22, and they are spaced at equal intervals around in the circumferential direction and are orthogonal to the circumferential direction. Also, around the inner peripheral surface of the housing 11 at locations that face the inside engagement grooves 25, there are six outside engagement grooves 26 that also have a circular arc shaped cross section and arc orthogonal to the circumferential direction. Moreover, the retainer 23 is ring shaped with a circular arc shaped cross section and it is held in place between the outer peripheral surface of the inner ring 22 and the inner peripheral surface of the housing 11. At six locations in the circumferential direction around this retainer 23, at positions that is in alignment with the inside and outside engagement grooves 25, 26, there are pockets 27, and a ball 24 is held in each of the six pockets 27 for a total of six balls 24. These balls 24 are held in the pockets 27, and are able to rotate freely along the inside and outside engagement grooves 25, 26.

When the rolling-bearing unit for wheels constructed as described above is installed in a vehicle, the outer race 1 is supported by the suspension device by the first installation flange 2, and the driven wheel is attached to the first inner-race member 4 by the second installation flange 7. Moreover, the tip end of the drive shaft (not shown in the drawings) is rotated and driven by the engine by way of the transmission, and it is connected to the inside of the inner ring 22 of the constant velocity joint by splines. When the vehicle is operated, the rotation of the inner ring 22 is transmitted to the hub 6, which includes the second inner-race member 5, by way of the multiple balls 24, and rotates and drives the driven wheel.

Figure 2:
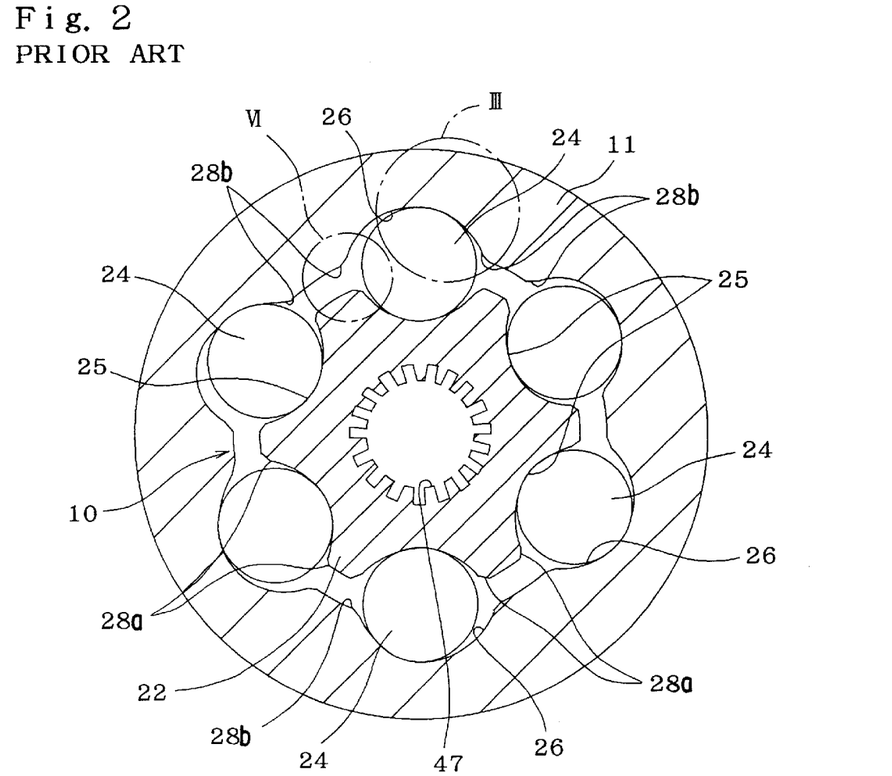
FIG. 2 is a cross sectional view taken along the line II—II in FIG. 1.
Figure 3:
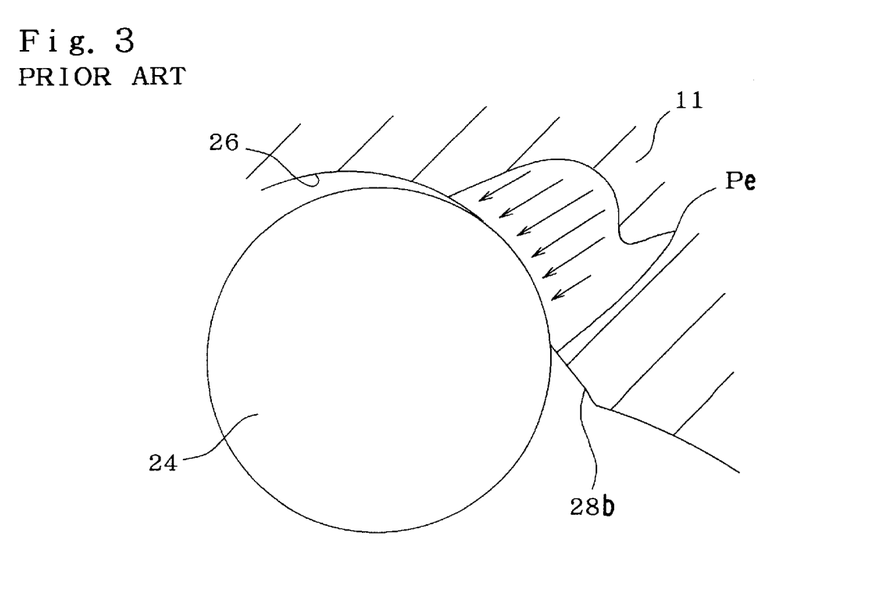
FIG. 3 is an enlarged view of Portion III in FIG. 2.

In the case of the prior rolling-bearing unit for wheels shown in FIG. 1, it is difficult to make it compact and lightweight. The reason for this is as follows. When transmitting rotating power between the inner ring 22 and the housing 11 of the constant velocity joint 10, the inside and outside engagement grooves 25, 26 and the ball 24 displace relative to the direction of contact between the rolling contact surface of the ball 24 and one side surface in the circumferential of the engagement grooves 25, 26, as shown exaggeratedly in FIGS. 2 and 3. As a result of this relative displacement, the balls 24 are displaces such that they ride up toward the opening of the inside and outside engagement grooves 25, 26. At the same time, the rolling contact surface of the ball 24 and the inner surface of the inside and outside engagement grooves 25, 26 come in contact with each other in the area of a contact ellipse whose long diameter is in the circumferential direction of the constant velocity joint 10. On the other hand, the inside and outside engagement grooves 25, 26 have chamfered surfaces 28a, 28b that are formed along the entire length of the engagement grooves 25, 26. The contact ellipse of the ball 24, due to the aforementioned displacement, moves toward the opening of the engagement grooves 25, 26, and when the contact ellipse reaches the chamfered surfaces 28a, 28b, edge load Pe, as shown in FIG. 3, occurs at the end edge of the chamfered surfaces 28a, 28b. This kind of edge load Pe reduces the rolling fatigue life of the rolling contact surface of the ball 24, as well as reduces the durability of the constant velocity joint 10, which is undesirable.

Therefore, up until now, in order to maintain the necessary durability, regardless of the reduction in rolling life due to the causes above, the outer diameter of the ball 24 was increased so that there is a margin in the load capacity on the balls. By increasing the outer diameter of these balls 24, the constant velocity joint 10 became larger, and the overall weight of the rolling-bearing unit for wheels was increased by that amount. Increased weight of the rolling-bear unit for wheels increases the unspring weight of the vehicle, so that it is desired to make this rolling-bearing unit for wheel more compact and light weight.

SUMMARY OF THE INVENTION

An object of the present invention is to provide a rolling-bearing unit for wheels, taking the above conditions into consideration, which is more compact and lightweight without the rigidity of the constant velocity joint reduced.

DETAILED DESCRIPTION OF THE PREFERRED EMBODIMENTS

The rolling-bearing units for wheels in an embodiment of this invention, similar to the prior rolling-bearing unit for wheel described above, each comprises an outer-race like member that does not rotate during operation and which has a first installation flange around its outer peripheral surface for attaching to the suspension device, and outer-ring raceways around its inner peripheral surface, an inner-race like member that rotates during operating, and which has a second installation flange for supporting the wheel on the outer peripheral surface on one end side, inner-ring raceways in the center, and a housing on the other end, which becomes the outer ring of a constant velocity joint, multiple rolling members that are located between the outer-ring raceways and inner-ring raceways and which are capable of rotating freely, and multiple outside engagement grooves, which have a circular arc shaped cross section, formed such that they run in a direction that is orthogonal to the circumferential direction. Moreover, these outside engagement grooves are chamfered at the opening portion on both sides in the circumferential direction.

In the rolling-bearing unit for wheels of this embodiment, the radial size of the chamfered portion is equal to or larger than the elastic displacement of the area of contact between the balls and the housing adjacent to each other when the surface pressure at the center of the contact area of the housing with the balls reaches 4200 MPa. The radial size means the size measured in a direction that is orthogonal to the tangential direction of the circumferential end edge of the outer engagement groove continuous with the chamfered surface.

In addition, in the rolling-bearing unit for wheels of another embodiment of this invention, the chamfered surfaces, are of the C chamfer with a straight cross section, and the angle of inclination of the C chamfer with respect to the edges in the circumferential direction of the outside engagement grooves is 10 degrees or less.

Furthermore, the rolling-bearing unit for wheels of another embodiment of this invention, the chamfered surfaces are of the round chamfer with a circular arc shaped cross section with radius of curvature of 2 mm or more, and the chamfered end edges of the round chamfer are smoothly continuous with the end edges in the circumferential direction of the outside engagement grooves.

In the case of the rolling-bearing unit for wheels of the embodiments, constructed as described above, it is difficult for large edge load to act on the rolling contact surface of the balls even when the contact ellipse, that exists in the area of contact between the rolling contact surface of the balls of the constant velocity joint and the inner surface of the outside engagement grooves, reaches the chamfered surface. Therefore, it is possible to maintain the rolling fatigue life of the rolling contact surface of the balls of the constant velocity joint even if the outer dimension of the balls is made small, and thus it is possible to make the rolling-bearing unit for wheels more compact and light weight.

Now, some embodiments of this invention are explained referring to the attached drawings.

FIGS. 4 thru 7 show a first embodiment of this invention. The outer race 1 (outer-race like member), which does not rotate when supported by the suspension device, has a first installation flange 2 formed around its outer peripheral surface for attaching to the suspension device, and double rows of outer-ring raceways 3a, 3b formed around its inner peripheral surface. An inner-race like member 31, which comprises a hub 29 and inner race 30, is located on the inside of the outer race 1 such that it is concentric with the outer race 1. On the outer peripheral surface of this inner-race like member 31, in the section which faces the outer-ring raceways 3a, 3b, there are first and second inner-ring raceways 8a, 12a. Of these inner-ring raceways 8a, 12a, the first inner-ring raceway 8a is formed directly around the outer peripheral surface in the center of the hub 29. Moreover, the inner race 30 fits around the center of the hub 29 closer to the axially inside end (the right end in FIG. 4) than the portion where the first inner-ring raceway 8a is formed. The second inner-ring raceway 12a is formed around the outer peripheral surface of this inner race 30. By placing rolling members 13 between the outer-ring raceways 3a, 3b and first and second inner-ring raceways 8a, 12a, respectively, such that they rotate freely, the inner-race like member 31 is supported on the inside of the outer race 1 so that it can rotate freely.

In example shown in the drawings, the first inner-ring raceway 8a is formed directly around the outer peripheral surface of the hub 29, so that the diameter of this first inner-ring raceway 8a is smaller than the diameter of the second inner-ring raceway 12a that is formed around the outer peripheral surface of the inner race 30. Moreover, as the diameter of the first inner-ring raceway 8a becomes smaller than the diameter of the second inner-ring raceway 12a, the diameter of the axially outside (outside in the width direction when installed in the automobile, or left side in FIG. 4) outer-ring raceway 3a, which faces the first inner-ring raceway 8a, is smaller than the diameter of the axially inside (inside in the width direction when installed in the automobile, or right side in FIG. 4) outer-ring raceway 3b. Furthermore, the outer diameter of the outside half of the outer race 1 where the axially outside outer-ring raceway 3a is formed, is smaller than the outer diameter of the inside half of the outer race 1 where the axially inside outer-ring raceway 3b is formed. Also, in the example shown in the drawings, together with making the diameters of the first inner-ring raceway 8a and axially outside outer-ring raceway 3a smaller, the number of rolling member 13 located between the first inner-ring raceway 8a and the axially outside outer-ring raceway 3a is less than the number of rolling member 13 located between the second inner-ring raceway 12a and the axially inside outer-ring raceway 3b.

Figure 4:
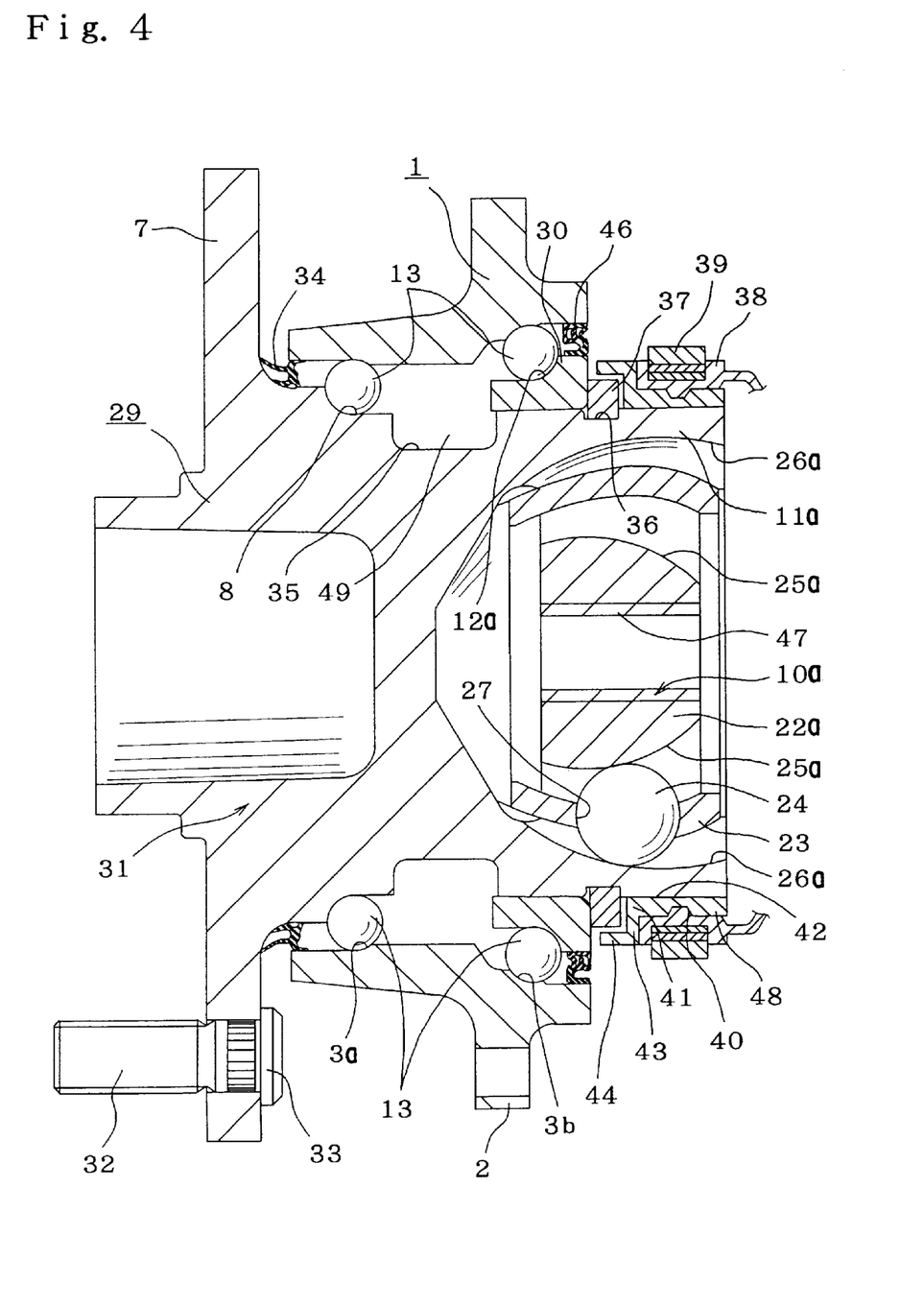
FIG. 4 is a cross sectional view of a first example of the embodiments of the present invention.

Moreover, there is a second installation flange 7 formed on the outer peripheral surface on the axially outside end of the hub 29 for supporting and attaching the wheel to the hub 29 such that it is integrated with this hub 29, and the base end of several studs 32 are formed on this second installation flange 7 for connecting to the wheel. In the example shown in the drawings, the diameter of the pitch circle of these studs 32 is made smaller by the same amount that the outer diameter on the outside half of the outer race 1 is made smaller than the outer diameter on the inside half as mentioned above, (so that the head 33 of the studs 32 do not interfere with the outer peripheral surface on the axially outside end of the outer race 1). Of the outer peripheral surfaces of the hub 29, the diameter of the section further inward in the axial direction than the section where the first inner-ring raceway 8a is formed is made smaller than the diameter of the inscribed circle of the rolling member 13 which correspond to this first inner-ring raceway 8a. The reason for this is so that when assembling the rolling-bearing unit for wheels, the rolling members 13 can be installed on the inner-radius side of the outer-ring raceway 3a, which is formed on the inner peripheral surface on the axially outside end of the outer race 1, and when a seal ring 34 is fitted on the inner peripheral surface at the axially outside end of the outer race 1, the hub 29 can be inserted freely inside the outer race 1. Moreover, formed around the outer peripheral surface in the center of the hub 29, in the section between the first inner-ring raceway 8a and the fitting portion with inner race 30, is a hollowed out section 35 that is concave all the way around the circumference of the hub 29, that makes it possible to make the hub 29 more light weight.

Moreover, in order to prevent the inner race 30 that fits around the hub 29 from shifting inward in the axial direction, and in order to maintain the preload applied to the rolling members 13 that are located between the outer-ring raceways 3a, 3b and first and second inner-race raceways 8a, 12a at a proper value, a retaining ring 37 is fastened to a concave attachment groove 36 that is formed all the way around the outer peripheral surface closer to the axially inside end of the hub 29. This retaining ring 37 comprises a pair of retaining-ring elements that both have a semi-circular arc shape. The inner peripheral portion of this retaining ring 37 fits into the concave attachment groove 36 and presses the inner race 30 outward in the axial direction with respect to the hub 29 in order to apply proper preload on the rolling members 13. A member for the retaining ring 37 with adequate thickness is selected for this purpose so that even when the force that is applied outward in the axial direction on the inner race 30 is removed, the proper preload is applied to the rolling members 13. In other words, several kinds of retaining rings 37 with slightly differing thicknesses were prepared, and a retaining ring 37 with adequate thickness dimensions to correspond with the dimensions of the components of the rolling-bearing unit, such as the concave attachment groove 36, is selected and fitting into the concave attachment groove 36. By fastening this retaining ring 37 to the concave attachment groove 36, it is possible to prevent the inner race 30 from shifting inward in the axial direction, and to maintain the proper preload on the rolling members 13 even when the pressing force is removed.

In order to prevent the pair of retaining-ring members of the retaining ring 37 from displacing outward in the radial direction, and to prevent it from carelessly coming out of the concave attachment groove 36, part of a spacer 48 is located around the retaining ring 37. This spacer 48 fits inside the axially outside end of a boot 38, for supporting, which prevents foreign matter such as rain water, and dirt from getting inside the constant velocity joint 10a which is made from the housing 11a formed on the inside end of the hub 29.

This boot 38 is made in one piece from an elastic material such as rubber or synthetic resin, and it has a bellows shape in the center and circular shape on both ends. The axially outside end of this boot 38 fits around the metal spacer 48 which fits tightly around the axially inside end of the hub 29, and it supports the outer peripheral surface of the spacer 48 by a support band 39. The inner peripheral surface on the axially outside end of the boot 38 fits all the way around in an engagement groove 40 that is formed around the outer peripheral surface of the spacer 48.

The section on the axially outside edge of the spacer 48 that sticks outward in the axial direction from the boot 38 is formed with a crank shaped cross section to make up a support 41 that goes all the way around. In order to form this support 41, the spacer 48 comprises a small-diameter cylindrical section 42 that fits around the axially inside end of the hub 29, a circular ring 43 that bends outward in the radial direction from the axially outside edge of this small-diameter cylindrical section 42, and a large-diameter cylindrical section 44 that bends outward in the axial direction from this circular ring 43. Of these, the axially outside surface of the circular ring 43 comes in contact with or faces very closely the axially inside surface of the retaining ring 37, and the inner peripheral surface of the large-diameter cylindrical section 44 comes in contact with or faces very closely the outer peripheral surface of the retaining ring 37. Moreover, there is a seal ring 34 located between the inner peripheral surface on the axially outside end of the outer race 1 and the outer peripheral surface in the center of the hub 29, and a combination seal ring 46 located between the inner peripheral surface on the axially inside end of the outer race 1 and the outer peripheral surface on the axially inside end of the inner race 30, and they cover the openings on both ends of the space 49 where the rolling members 13 are located.

Furthermore, the section on the axially inside end of the hub 29, around which the inner race 30 and the axially outside end of the boot 38 fit, becomes the housing 11a or the outer ring of the constant velocity joint 10a. On the inner peripheral surface of this housing 11a, are formed six outside engagement 26a that have a circular arc shaped cross section when cut with an imaginary plane that is orthogonal to the center axis of the housing 11a, and they extend perpendicular to the circumferential direction (left and right direction in FIG. 4, or front and back direction in FIG. 5). Moreover, on the inside of the housing 11a, there is an inner ring 22a in order to form the Rzeppa-type constant velocity joint 10a. On the outer peripheral surface of this inner ring 22a, there are six inside engagement grooves 25a. 25a that extend perpendicular to the circumferential direction. Also, there is one ball 24 located between each of these inside engagement grooves 25a, 25a and the outside engagement grooves 26a, 26a, for a total of 6 balls 24, and they are held in the pocket 27 of a retainer 23 so that they can rotate freely. Also, in the center of the inner ring 22a, there is a spline hole 47 which extends in the axial direction. When installed in an automobile, the spline on the tip end of the drive shaft (not shown in the drawings) fits in this spline hole 47, making it possible to freely rotate and drive the hub 29 by way of the inner ring 22a and six balls 24.

If the surface pressure at the center of the contact area between the balls and the housing exceeds 4200MPa, the permanent deformation of the balls becomes large. The maximum rolling member load during use is designed not to exceed this value, which is described in ISO281, 1990, JIS B1518.

Figure 11:
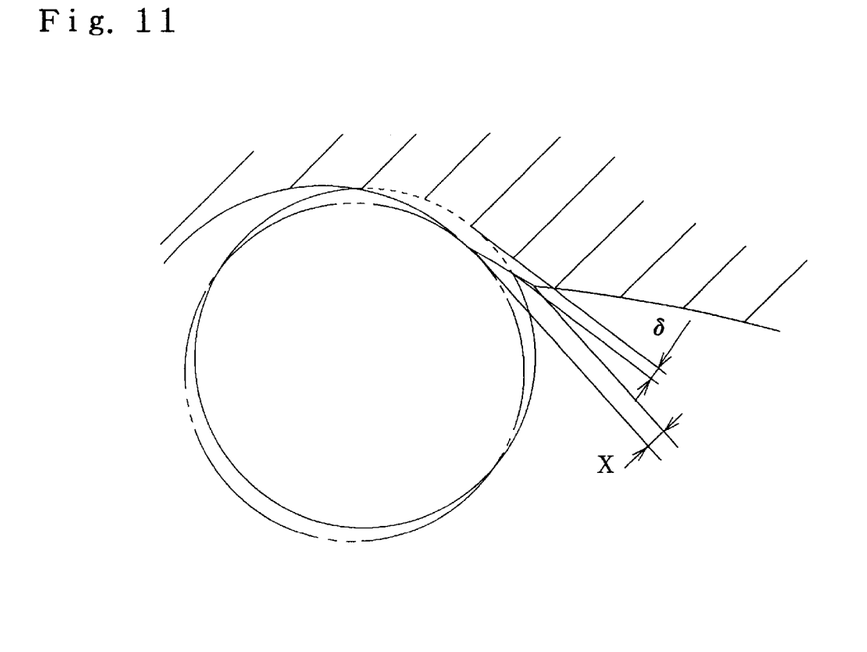
FIG. 11 is an enlarged cross sectional view corresponding to Portion III in FIG. 2, wherein provided that the elastic displacement of the area of contact between the balls and the housing adjacent to each other is δ when the load is applied to the balls such that the surface pressure at the center of the contact portion between the balls and the housing is 4200MPa, and that the radial size of the chamfered portion is X, X≧δ. The radial size means the size measured in a direction that is orthogonal to the tangential direction of the circumferential end edge of the outer engagement groove continuous with the chamfered surface.

FIG. 11 shows an example of this embodiment, wherein provided that the elastic displacement of the area of contact between the balls and the housing adjacent to each other is $\delta$ when the load is applied to the balls such that the surface pressure at the center of the contact area between the balls and the housing is 4200MPa, and that the radial size of the chamfered portion is X, $X \geq \delta$. The radial size means the size means the size measured in a direction that is orthogonal to the tangential direction of the circumferential end edge of the outer engagement groove continuous with the chamfered surface.

Figure 12:
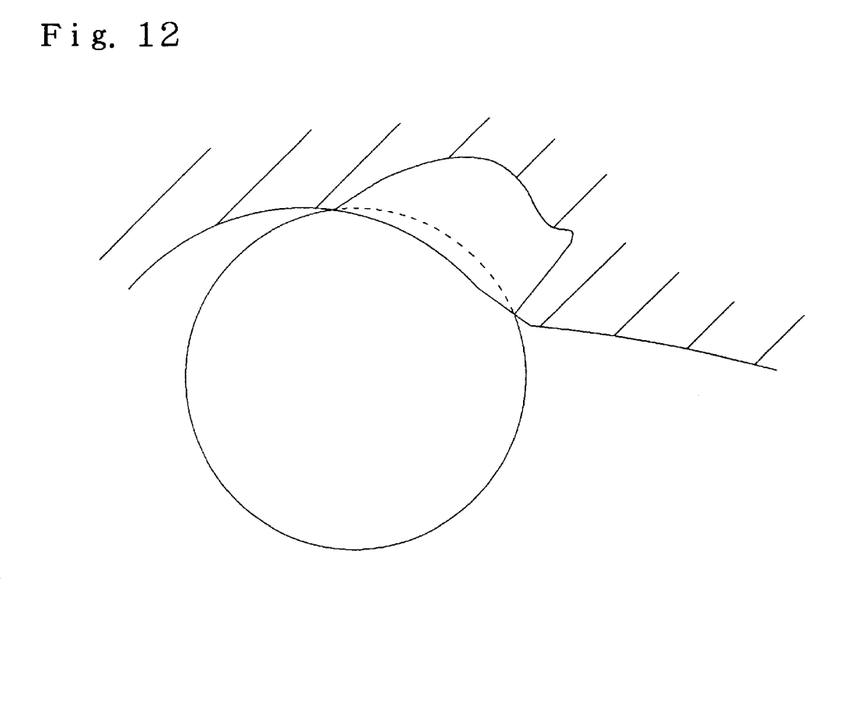
FIG. 12 is an enlarged cross sectional view corresponding to Portion III in FIG. 2, which shows the distribution of surface pressure in the case of FIG. 11, wherein the contact portion between the balls and the housing protrudes from the engagement groove, but not from the chamfered portion.

FIG. 12 shows the distribution of surface pressure in the case of FIG. 11, wherein the contact area between the balls and the housing protrudes from the engagement groove, but not from the chamfered portion, and since the surface pressure in the chamfered portion gradually decreases, no large edge load is produced, and therefore the relationship of $X \geq \delta$ is required in order that the contact portion between the balls and the housing does not protrude from the chamfered portion in any contact condition.

Figure 13:
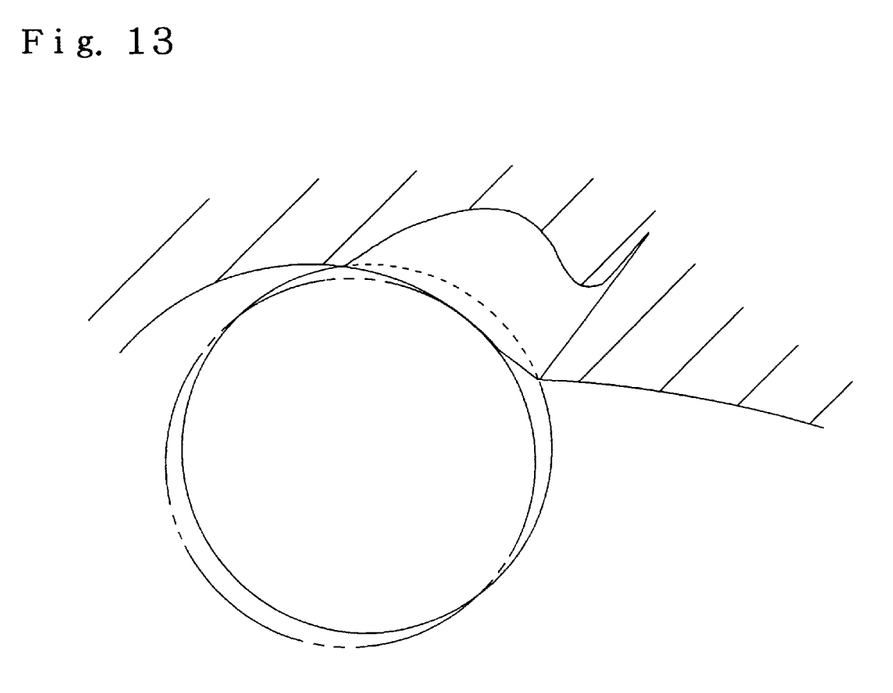
FIG. 13 is an enlarged cross sectional view corresponding to Portion III in FIG. 2, which shows the distribution of surface pressure in the case of small chamfer degree, wherein the contact portion between the balls and the housing protrudes from the chamfered portion.

FIG. 13 shows the distribution of surface pressure in the case of small chamfer degree, wherein the contact area between the balls and the housing protrudes from the chamfered portion, so that a large edge load is produced at the end of the chamfered portion.

Figure 5:
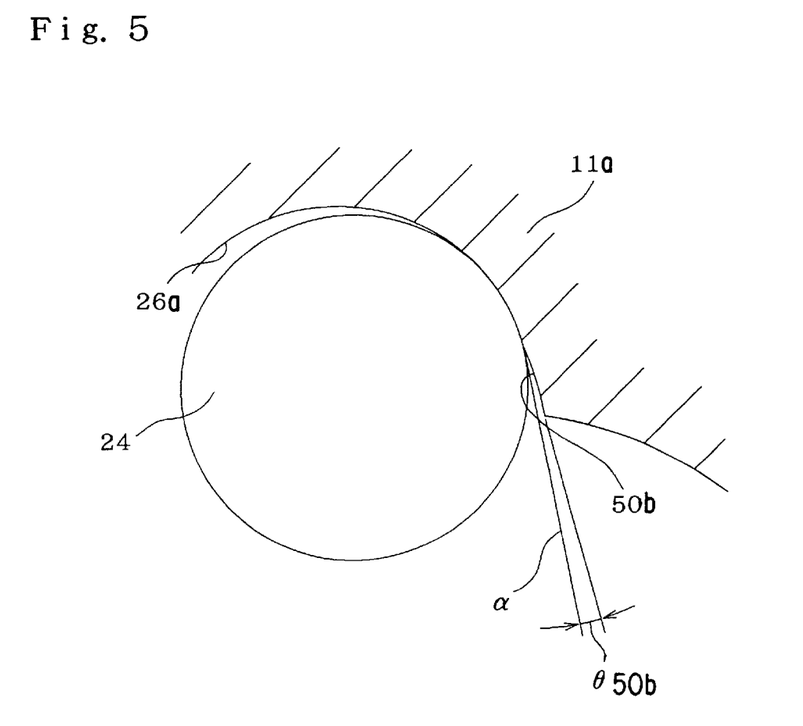
FIG. 5 is an enlarged cross sectional view corresponding to Portion III in FIG. 2.
Figure 6:
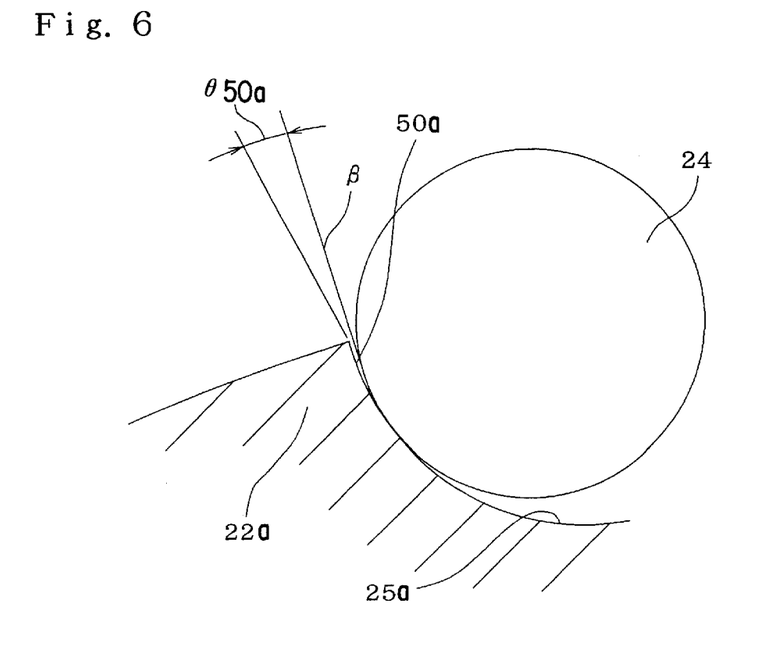
FIG. 6 is an enlarged cross sectional view corresponding to Portion VI in FIG. 2.

In the rolling-bearing unit for wheels of this invention, the chamfered surfaces 50a, 50b, which are formed on both sides in the circumferential direction on the opening edge of the inside and outside engagement grooves 25a, 26a, are C chamfers with a straight cross section. Also, the angles of the chamfered surfaces 50a, 50b with respect to the end edge in the circumferential direction of the inside and outside engagement grooves 25a, 25b arc up to 10 degrees. In other words, for the outside engagement groove 26a, as shown in FIG. 5, the angle of intersection, $\Theta_{50b}$, between an imaginary line "α" that is drawn in the tangential direction of the end edge in the circumferential direction of the outside engagement groove 26a and the chamfered surface 50b is 10 degrees or less (10 degrees $\geq \Theta_{50b}$). Moreover, for the inside engagement groove 25a, as shown in FIG. 6, the angle of intersection, $\Theta_{50a}$, between an imaginary line "β" that is drawn in the tangential direction of the end edge in the circumferential direction of the inside engagement groove 25a and the chamfered surface 50a is 10 degrees or less (10 degrees $\geq \Theta_{50a}$).

Figure 7:
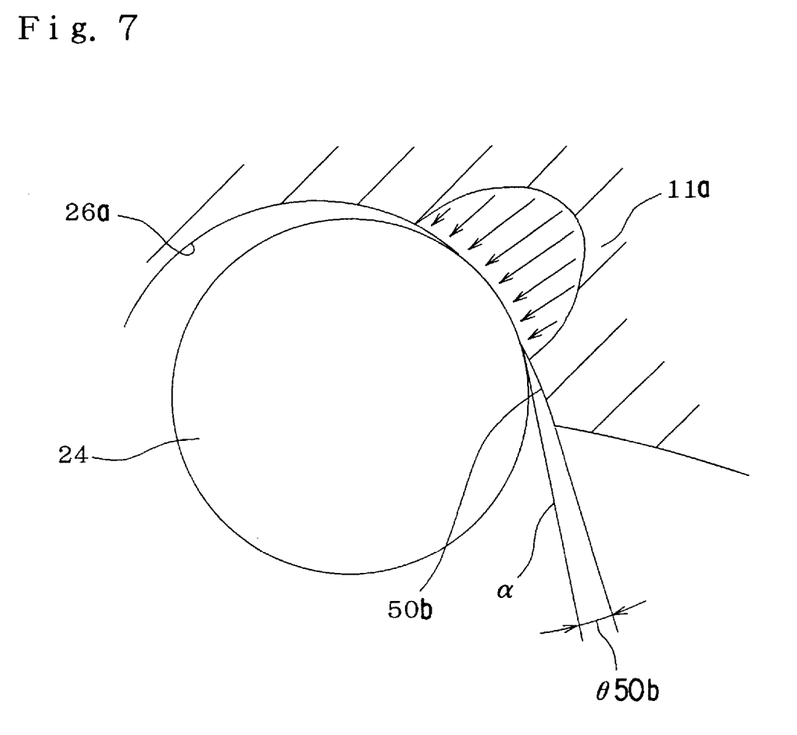
FIG. 7 is an enlarged cross sectional view corresponding Portion III in FIG. 2, where a condition of surface pressure applied to the rolling contact surface of the balls is shown.

With the rolling-bearing unit for wheels of this invention, constructed as described above, even if the contact ellipse that exists in the area of contact between the rolling contact surface of the balls 24 and the inner surface of the inside and outside engagement grooves 25a, 26a reaches the chamfered surfaces 50a, 50b, it is difficult for large edge load to be applied to the rolling contact surface of the balls 24. In other words, since the portions closer to both ends in the circumferential direction on the inner surface of the inside and outside engagement grooves 25a, 26a are smooth and continuous with the chamfered surfaces 50a, 50b, and not a sharp edge, even if the contact ellipse reaches the chamfered surfaces 50b (or 50a), as shown in FIG. 7, there is no large edge load on the rolling contact surfaces of the balls 24. Therefore, the rolling fatigue life of the rolling contact surfaces is increased, thus making it possible to improve the durability of the constant velocity joint 10a. Also, if the required durability is the same, it is possible, by the amount that the durability is increased, to reduce the outer diameter of the balls 24 of the constant velocity joint 10a, to make the rolling-bearing unit for wheels even more compact and light weight. It is also possible to make the chamfered surface 50b (or 50a) and the inner peripheral surface of the engagement groove 26a (or 25a) continuous using a curved surface with an arc shaped cross section.

In the rolling-bearing unit for wheels of this invention, constructed as described above, the function of supporting the wheel so that it turns freely with respect to the suspension device is the same as for the prior art rolling-bearing unit for wheels described previously. Particularly, as described above, with the rolling-bearing unit for wheels of this invention, it is possible to maintain the rolling fatigue life of the rolling contact surface of the balls 24 of the constant velocity joint 10a, even if the outer dimension of these balls 24 is decreased, and it is possible to make the rolling-bearing unit for wheels more lightweight and compact. Moreover, it is capable of adequately maintaining the rigidity of the constant velocity joint 10a in the direction of transmission of the rotation force, which is different from the case where the edge load is kept to a minimum by increasing the radius of curvature of the engagement grooves 25a, 25b.

Furthermore, in the examples shown in the drawings, and as described above, by making smaller the diameter of the pitch circle of the rolling members 13 on the axially outside row, it is possible to make the outer diameter on the outer half of the outer race 1 smaller. Also, it is possible to make smaller the diameter of the pitch circle of the studs 32, which are fixed to the second installation flange 7 formed on the outer peripheral surface of the hub 29 by the amount that the outer diameter on the outer half of the outer race 1 is made smaller. Moreover, it is possible to make smaller the outer diameter of the second installation flange 7 which supports the studs 32 without increasing the dimension in the axial direction of the hub 29, and thus it is possible to make the rolling-bearing unit for wheels even more compact and lightweight. Also, overlapping part of the outside engagement groove 26a with the second inner-ring raceway 12a in the radial direction contributes to making the rolling-bearing unit for wheels more compact and lightweight because of reduction in the axial size.

As the diameter of the pitch circle of the rolling members 13 in the axially outside row is made smaller than the diameter of the pitch circle of the rolling members 13 on the inside row, the basic dynamic load rating of the axially outside ball row section becomes smaller than the basic dynamic load rating of the axially inside ball row section. Moreover, if the load applied to both rows is the same, the life of the axially outside ball row section becomes shorter than the life of the axially inside ball row section. In regards to this, for general automobiles, the load applied to the axially outside ball row section is smaller than the load applied to the axially inside ball row section. Therefore, it is becomes easier to design a rolling-bearing unit where the life of both row sections is nearly the same, making it possible for efficient design work. In the example shown in the drawings, balls are used as the rolling members 13, however, in the case of a rolling-bearing unit for heavy vehicles, tapered rollers may be used as the rolling members. Of course this invention is also applicable to a rolling-bearing unit which uses tapered rollers in this way as the rolling members.

Figure 8:
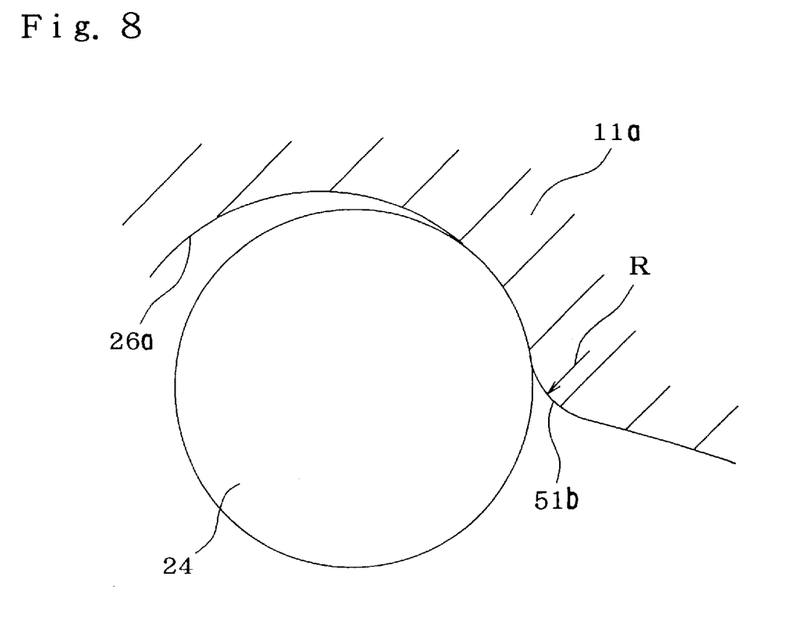
FIG. 8 is an enlarged cross sectional view corresponding to Portion III in FIG. 2 to show a second example of the embodiments of the present invention.
Figure 9:
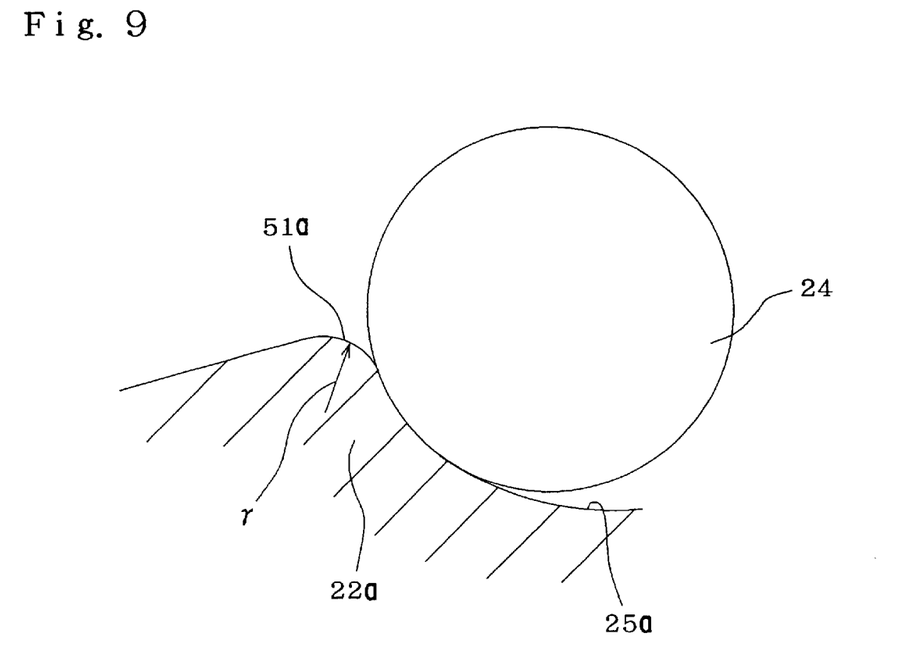
FIG. 9 is an enlarged cross sectional view corresponding to Portion VI of FIG. 2.
Figure 10:
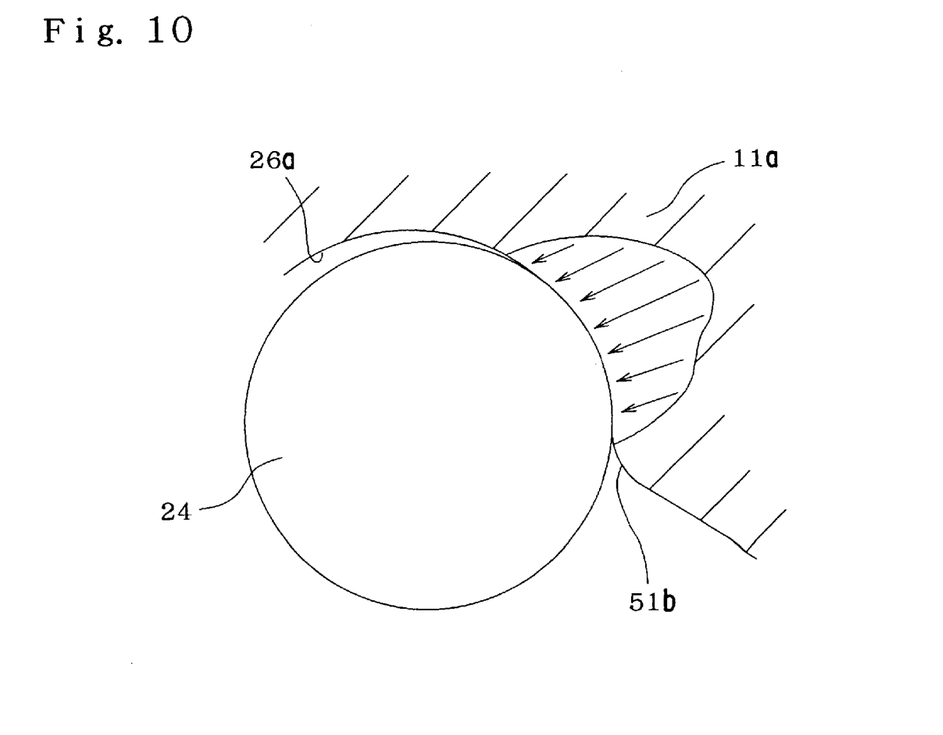
FIG. 10 is an enlarged cross sectional view corresponding to Portion III in FIG. 2, wherein a condition of surface pressure applied to the rolling contact surface of the balls is shown.

Next, FIGS. 8 thru 10 show a second embodiment of this invention. In the rolling-bearing unit for wheel of this embodiment, the chamfered surfaces 51a, 51b formed on the opening edges on both sides in the circumferential direction of the inside and outside engagement grooves 25a, 26a have a circular arc shaped cross section with a radius of curvature of 2 mm or greater (r≧2 mm). These chamfered surfaces 51a, 51b, which are curved, are smooth and continuous with the end edges in the circumferential direction of the inside and outside engagement grooves 25a, 26a. In other words, for the outside engagement groove 26a, as shown in FIG. 8, the tangential direction of the end edges in the circumferential direction of the outside engagement groove 26a coincides with the tangential direction of the end edges of the chamfered surfaces 51b. Moreover, for the inside engagement groove 25a, as shown in FIG. 9, the tangential direction of the end edges in the circumferential direction of the inside engagement groove 25a coincides with the tangential direction of the end edges of the chamfered surfaces 51a.

With the rolling-bearing unit for wheels of this embodiment, constructed as described above, it is difficult for large edge loads to be applied on the rolling contact surfaces of the balls 24 even when the contact ellipse that exists in the area of contact between the rolling contact surface of the balls 24 and the inner surface of the inside and outside engagement grooves 25a, 26a reaches the chamfered surfaces 51a, 51b. In other words, since the portions closer to both edges in the circumferential direction on the inner surface of the inside and outside engagement grooves 25a, 26a, are smooth and continuous with the chamfered surfaces 51a, 51b large edge loads are not applied to the rolling contact surface of the balls 24 even when the contact ellipse reaches the chamfered surfaces 51a, 51b, as shown in FIG. 10. Therefore, it is possible to decrease the outer diameter of the balls 24 of the constant velocity joint as was done in the first embodiment described above, and thus make it possible to make the rolling-bearing unit for wheels more compact and lightweight.

This invention is constructed and functions as described above, making it possible to make the rolling-bearing unit for wheel more compact and lightweight, and thus improve the performance of an automobile that is installed with this rolling-bearing unit for wheels.

What is claimed is:

1. A rolling-bearing unit for a vehicle wheel comprising:
   a stationary member fixed to a suspension and having an inner peripheral surface formed with an outer ring raceway,
   a rotatable member provided to support the vehicle wheel and having an outer peripheral surface formed with an inner ring raceway and a housing which is to be an outer ring of a constant velocity joint,
   a plurality of rolling members rotatably provided between the outer ring raceway and the inner ring raceway,
   balls provided to be in contact with the housing,
   the housing having an inner peripheral surface formed with a plurality of outer engagement grooves extending at right angles with respect to the circumferential direction,
   the outer engagement grooves having an opening on both of the circumferential sides which is provided with a chamfered portion, and
   the chamfered portion having a radial size which is to be larger than the elastic displacement of the area of contact between the balls and the housing adjacent to each other when the surface pressure at the center of the contact portion of the housing with the balls reaches 4200 MPa.

2. The bearing unit of claim 1, wherein the chamfered portion is of a straight shape in cross section, and the inclination angle of the chamfered portion with reference to the circumferential end edge of the outer engagement groove is up to 10 degrees.

3. The rolling bearing unit of claim 1, wherein the chamfered portion is of an arcuate shape in cross section and having a radius of curvature of at least 2 mm.

* * * * *